United States Patent
Dudar et al.

(10) Patent No.: US 9,694,674 B2
(45) Date of Patent: Jul. 4, 2017

(54) SYSTEMS AND METHODS FOR DETERMINING THE INTEGRITY OF INTERNAL FUEL TANK STRUCTURAL SUPPORTS

(71) Applicant: Ford Global Technologies, LLC, Dearborn, MI (US)

(72) Inventors: Aed M. Dudar, Canton, MI (US); Scott A. Bohr, Novi, MI (US); Kevin Lucka, Madison Heights, MI (US); Wolfgang Krings, Kall (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/879,587

(22) Filed: Oct. 9, 2015

(65) Prior Publication Data

US 2017/0101002 A1    Apr. 13, 2017

(51) Int. Cl.
| | | |
|---|---|---|
| B29C 49/20 | (2006.01) | |
| B60K 15/03 | (2006.01) | |
| B60K 6/22 | (2007.10) | |
| G01L 1/22 | (2006.01) | |

(52) U.S. Cl.
CPC ............ B60K 15/03 (2013.01); B60K 6/22 (2013.01); G01L 1/22 (2013.01); B60K 2015/0321 (2013.01); B60K 2015/03072 (2013.01); B60K 2015/03486 (2013.01)

(58) Field of Classification Search
CPC B60K 6/22; B60K 15/03; B60K 2015/03486; B60K 2015/03072; B60K 2015/0321; B60K 2015/0319; B60K 2015/03328; G01L 1/22; B29C 2049/2013
See application file for complete search history.

(56) References Cited

U.S. PATENT DOCUMENTS

| | | |
|---|---|---|
| 6,099,042 A | 8/2000 | Cook et al. |
| 7,313,467 B2 | 12/2007 | Breed et al. |
| 7,819,272 B2 | 10/2010 | Sugiura |
| 8,984,934 B2 | 3/2015 | Sweppy et al. |
| 2014/0014663 A1 | 1/2014 | Eulitz et al. |
| 2014/0298885 A1 | 10/2014 | Criel et al. |

FOREIGN PATENT DOCUMENTS

| | | |
|---|---|---|
| DE | 10109058 A1 | 9/2002 |
| WO | 2015027724 A1 | 3/2015 |

OTHER PUBLICATIONS

Google automated translation of Applicant's DE 10109058 A1, published Sep. 5, 2002.*
Anonymous, "NIRCOS Plastic Tank Structural Integrity Check," IPCOM No. 000241985, Published Jun. 11, 2015, 2 pages.

* cited by examiner

*Primary Examiner* — Edward J Pipala
(74) *Attorney, Agent, or Firm* — James Dottavio; McCoy Russell LLP

(57) ABSTRACT

A fuel system comprises a fuel tank including at least a top wall, a bottom wall, and one or more stanchions positioned within the fuel tank, each stanchion coupled to the top wall and the bottom wall. A strain gauge is positioned on the outside of the fuel tank, opposite an intersection of a stanchion and the top wall, such that degradation of the stanchion results in results in pressure-dependent deformation of the fuel tank that is registered by the strain gauge. In this way, degradation of deformable fuel tanks, such as polymeric fuel tanks, may be diagnosed and indicated.

14 Claims, 6 Drawing Sheets

SYSTEMS AND METHODS FOR DETERMINING THE INTEGRITY OF INTERNAL FUEL TANK STRUCTURAL SUPPORTS

FIELD

The present description relates generally to methods and systems for determining the integrity of a deformable fuel tank.

BACKGROUND/SUMMARY

Fuel tanks are subject to pressure and vacuum changes due to differences between atmospheric pressure around the tank body and the pressure of a gaseous mixture of air and fuel vapor in the fuel tank body. For example, when gas pressure in the tank body exceeds atmospheric pressure, the top of the tank body may expand away from the bottom of the tank body. When atmospheric pressure exceeds the gas pressure in the tank body, the top of the tank body may collapse toward the bottom of the tank body. Pressure and vacuum changes experienced by a fuel tank may increase when sealed evaporation control (EVAP) systems are employed to reduce evaporative emissions and fuel leakage, e.g., in hybrid electric vehicles. Such tanks may thus be manufactured from thick steel to withstand pressure and vacuum builds that occur in a sealed tank over a diurnal temperature cycle.

In order to reduce vehicle weight and thus improve battery life and fuel economy, fuel tanks may be made of light-weight materials such as plastics. Such tanks are prone to deflection and deformation when subjected to increased pressure or vacuum. As such, the tank may include rigid structural elements within the fuel tank body in addition to various non supportive components such as sensors and fuel delivery components. Structural elements may be strategically placed to support regions of the fuel tank that are most likely to deflect due to pressure differentials.

However, in the event of a vehicle crash, such structural elements are prone to breaking. This compromises the structural integrity of the fuel tank, increasing the likelihood of fuel tank deformation. This may result in damage to a plastic fuel tank that breaches the walls of the tank, leading to unwanted emissions and/or fuel leakage. As such, being able to diagnose a damaged or degraded structural support is imperative as fuel tank design trends to light-duty enclosures.

Other attempts to address deformation of plastic fuel tanks include correlating fuel level, fuel tank pressure, and other fuel tank parameters. One example approach is shown by Criel et al. in U.S. 2014/0298885. Therein, a method for estimating fuel tank deformation is presented using on-board sensors coupled to the fuel tank. However, Criel does not provide means for determining whether the deformation is indicative of the degradation of structural supports. As such, damage to the fuel tank may go unnoticed as long as the fuel level is within a plausible range.

In one example, the issues described above may be addressed by a fuel system that comprises a fuel tank including at least a top wall, a bottom wall, and one or more stanchions positioned within the fuel tank, each stanchion coupled to the top wall and the bottom wall. A strain gauge is positioned on the outside of the fuel tank, opposite an intersection of a stanchion and the top wall, such that degradation of the stanchion results in results in pressure-dependent deformation of the fuel tank that is registered by the strain gauge. In this way, degradation of deformable fuel tanks, such as polymeric fuel tanks, may be diagnosed and indicated.

As one example, following an indication of a vehicle collision, the strain gauges may be read along with the ambient temperature. After a duration in which the ambient temperature changes significantly, the strain gauges may be read again. Significant deviation in strain gauge output over this period may be indicative of a broken stanchion, thus allowing the vehicle operator to be alerted to the potential problem.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
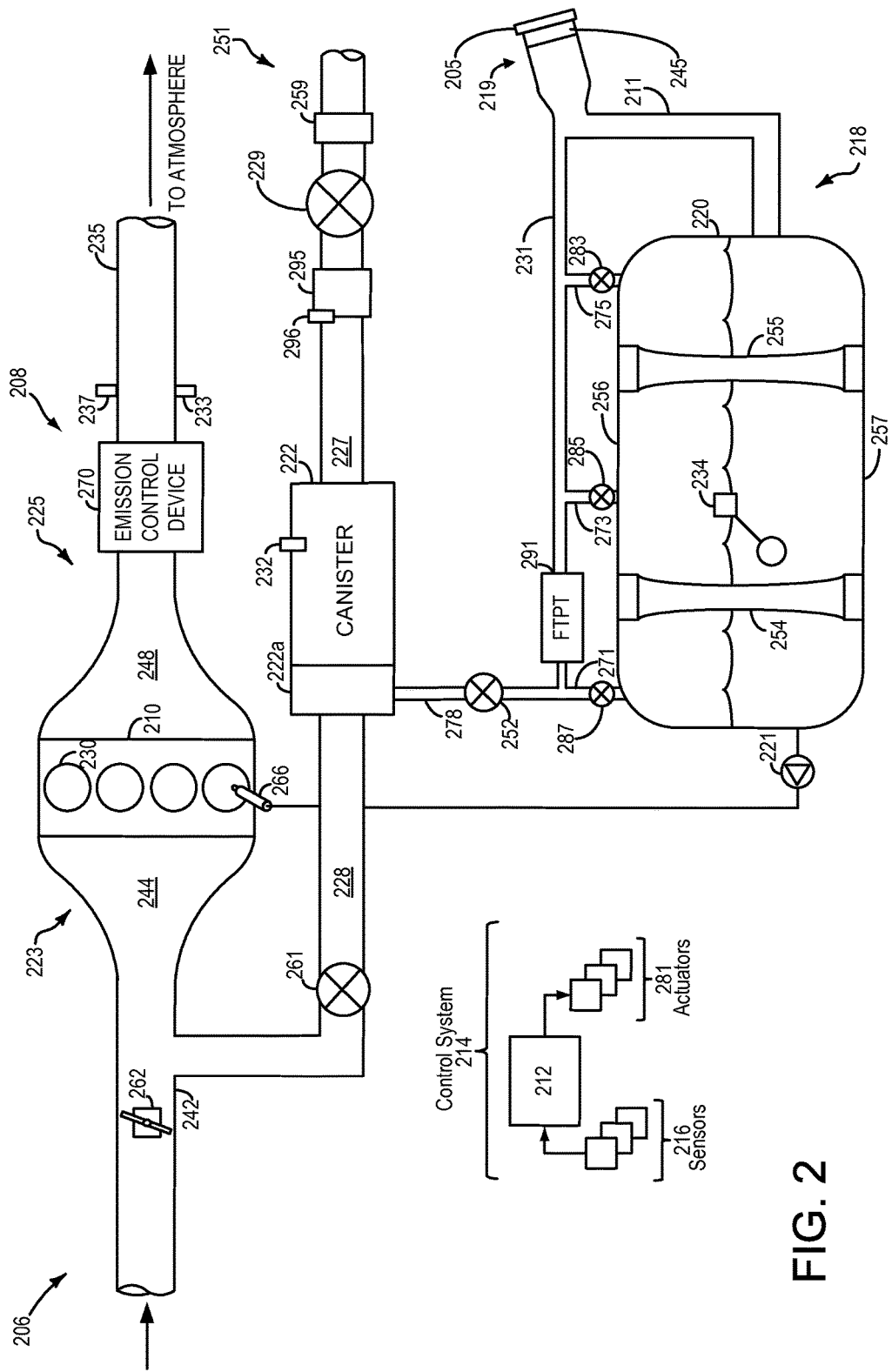
FIG. 2 schematically shows an example vehicle system comprising an engine system coupled to a fuel system and an evaporative emissions system.
Figure 3A:
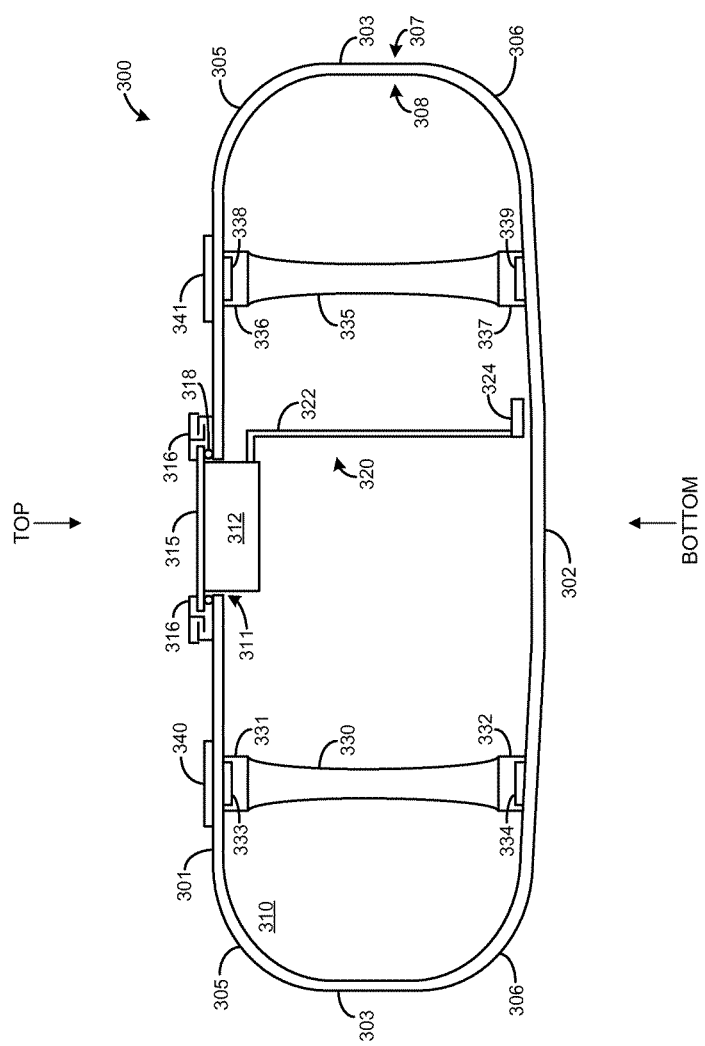
FIG. 3A schematically depicts an example fuel tank in a cut-away side view
Figure 3B:
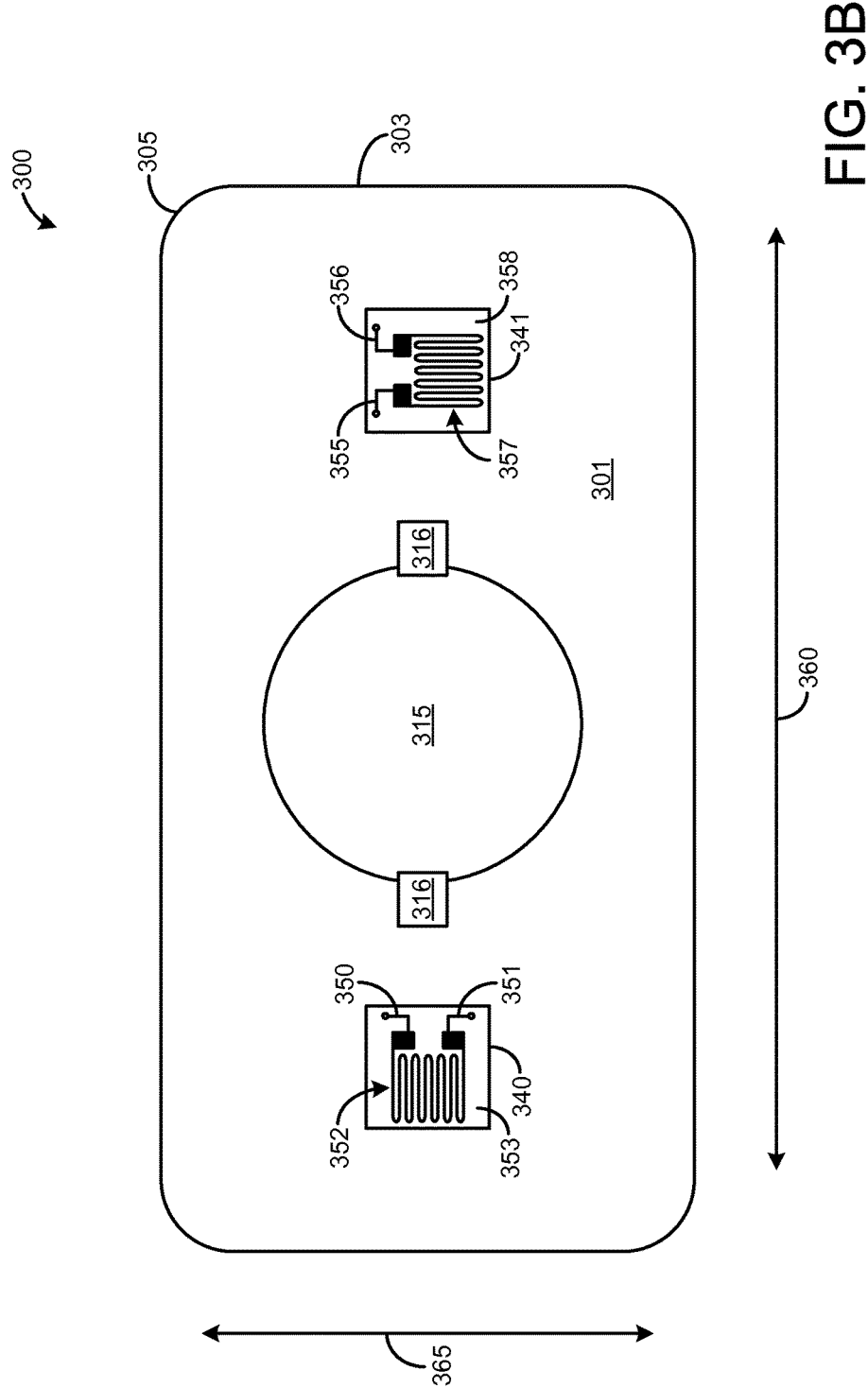
FIG. 3B schematically depicts the example fuel tank of FIG. 3A in a top-down view.

The following description relates to systems and methods for determining the integrity of structural supports for a deformable fuel tank, such as a plastic fuel tank comprising internal rigid stanchions. Plastic fuel tanks may be used in vehicles featuring a hybrid-electric propulsion system, such as the vehicle propulsion system shown in FIG. 1, in order to reduce the overall weight of the vehicle. However, most hybrid-electric vehicles include an evaporative emissions system comprising a fuel tank isolation valve utilized to seal the fuel tank and prevent unwanted evaporative emissions. Such an evaporative emissions system is shown in FIG. 2 coupled to a fuel system, engine system, and emissions system. A plastic fuel tank is thus prone to deformation due to pressure changes that occur with diurnal temperature changes when the fuel tank is sealed. As shown in FIG. 3A, such a fuel tank may include one or more internal stanchions to provide structural rigidity to the tank and prevent deformation. However, the internal stanchions are prone to breaking if the vehicle is involved in a crash or collision. As such, strain gauges may be applied to the exterior of the fuel tank, opposite the intersection of the internal stanchions and the top wall of the fuel tank, as depicted in FIGS. 3A and 3B. Following a collision, the strain gauges may be monitored for stress changes. Using a method such as the method shown in FIG. 4, stanchion degradation may be diagnosed, and the vehicle operator alerted. A timeline for an example vehicle collision event and subsequent fuel tank diagnosis is shown in FIG. 5.

Figure 1:
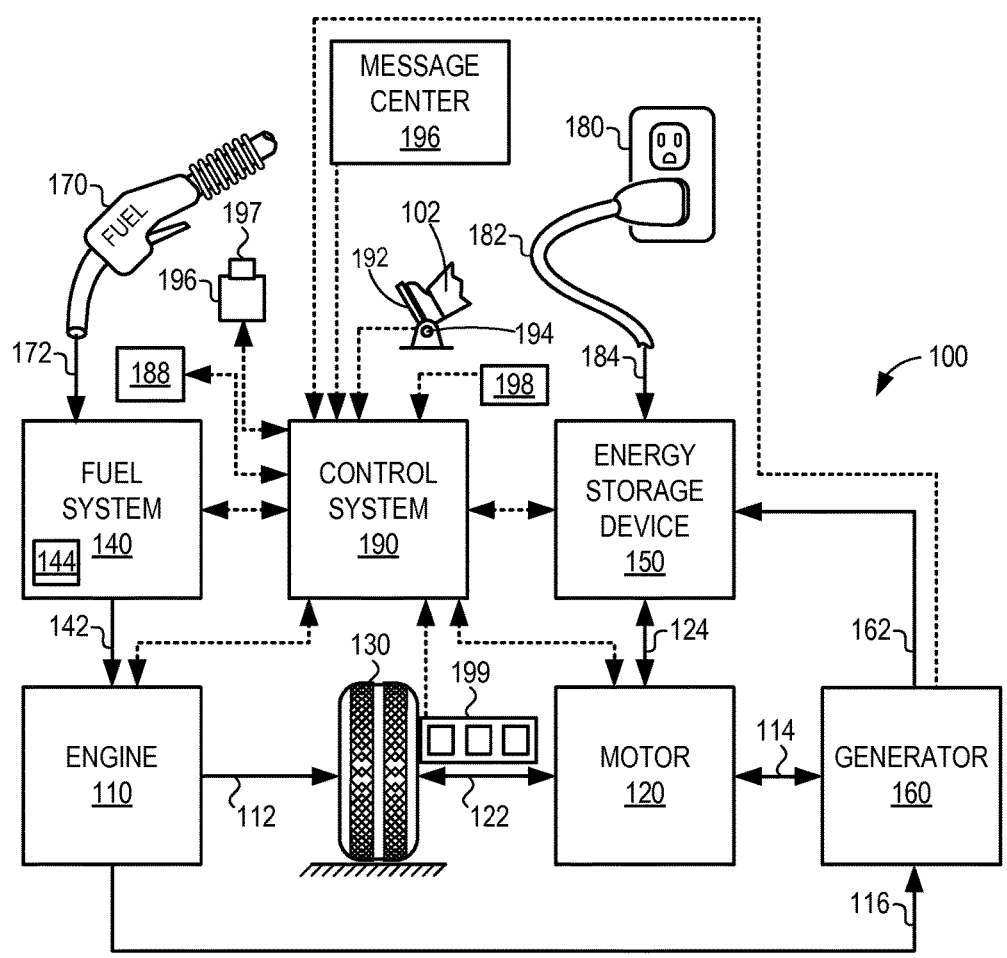
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

One or more crash sensors 188 may be mounted to vehicle propulsion system 100. The sensor(s) may be operable to measure and/or detect a crash, in order to deploy and/or activate a safety device, such as the deployment of one or more air bags or the locking of seatbelt restraints. Illustrative crash sensors may include, but are not limited to: accelerometers, pressure transducers, thermocouples, load cells, deflection and contact sensors, and/or any other type of sensor that may trigger deployment of safety devices during a crash. In some examples, crash sensors 188 may be configured to enable tunable deceleration characteristics.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

The outer walls of fuel tank 220 may be composed of one or more flexible metal materials, and/or may be at least partially composed of polymer or plastic materials. By reducing the thickness and/or rigidity of the outer walls, fuel tank 220 may be reduced in weight, but may also be prone to deformation due to outward stress, pressure differentials, etc. As such, fuel tank 220 may comprise stanchions 254 and 255, which may support at least a portion of top wall 256 and bottom wall 257. Stanchions 254 and 255 may provide structural support and/or rigidity when fuel tank 220 is composed of a flexible or deformable material. Further details regarding fuel tank and stanchion structure and function are provided herein and with regard to FIGS. 3A and 3B.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits 278 and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are provided in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283 The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 220, the vent valves may be open or closed. For example, GVV 287 may be normally open allowing for diurnal and "running loss" vapors from the fuel tank to be released into canister 222, preventing over-pressurizing of the fuel tank. However, during vehicle operation on an incline, when a fuel level as indicated by fuel level indicator 34 is artificially raised on one side of the fuel tank, GVV 287 may close to prevent liquid fuel from entering vapor recovery line 231. As another example, FLVV 285 may be normally open, however during fuel tank refilling, FLVV 285 may close, causing pressure to build in vapor recovery line 231 as well as at a filler nozzle coupled to the fuel pump. The increase in pressure at the filler nozzle may then trip the refueling pump, stopping the fuel fill process automatically, and preventing overfilling.

Further, in some examples, vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 and canister vent valve 229, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291, fuel level sensor 234, and canister temperature sensor 232. Other sensors such as pressure, temperature, air/fuel ratio, and crash sensors may be coupled to various locations in the vehicle system 206. As another example, the actuators may include fuel injector 266, throttle 262, fuel tank isolation valve 252, ELCM 295, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with reference to FIG. 4.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump configured to apply a negative pressure to the fuel system when in a first conformation, such as when administering a leak test. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed. The ELCM vacuum pump may be a reversible vacuum pump, and thus configured to apply a positive pressure to the fuel system when a bridging circuit is reversed placing the pump in a second conformation.

FIGS. 3A and 3B schematically depict an example fuel tank 300. Fuel tank 300 is shown in a cut-away side view in FIG. 3A, and shown in a top-down view in FIG. 3B. Fuel tank 300 includes a top wall 301 and an opposing bottom wall 302. Top wall 301 and bottom wall 302 join at an edge or sidewall 303 of fuel tank 300. As described with reference to fuel tank 220 of FIG. 2, fuel tank 300 may be configured to store and assist in delivery of fuel to an engine.

In some examples, the outer walls (301, 302, and 303) of fuel tank 300 may be composed of one or more metal materials, e.g., steel or the like. In other examples, the outer walls of fuel tank 300 may be composed at least partially of polymer or plastic materials. For example, the outer walls of fuel tank 300 may be composed at least partially of high density polyethylene (HDPE) and may be produced by a suitable molding process, e.g., using a blow molding or a twin sheet thermoforming process. In some examples, the outer walls of fuel tank 300 may be composed of polyolefins, thermoplastic polyesters, polyketones, polyamides and copolymers thereof. A blend of polymers or copolymers may also be used, as may a blend of polymers with inorganic, organic and/or natural fillers, such as, for example but nonlimitingly: carbon, salts and other inorganic derivatives, natural or polymer fibers. It is also possible to use multilayer structures made up of stacked and bonded layers comprising at least one of the polymers or copolymers described above.

In examples where the fuel tank is composed of metal materials, e.g., steel or the like, the fuel tank may be stamped and welded. In this example, the structurally supportive stanchions, described in more detail below, may be used to reduce the gage of the fuel tank walls. In a blow molding process, for example, a mass of liquid plastic at elevated temperature may be expanded in a mold by injecting gas under pressure into the plastic mass to form the fuel tank.

In some examples, fuel tank 300 may be produced using a twin sheet thermoforming process. For example, two sheets extruded from an HDPE resin may form two separate halves of the fuel tank outer wall. During the forming process auxiliary components of the fuel system may be positioned and installed on the inner wall of the tank. The two halves of the outer walls of the tank may then be brought together while still molten to seal them into a fuel tank shell. In other examples, fuel tank 300 may be produced via a split blow molding process wherein a single molded body is cut in half so that various auxiliary components of the fuel system may be positioned and installed on the inner wall of the tank. The two halves of the outer walls of the tank may then be welded together into a fuel tank shell.

The sidewall 303 of fuel tank 300 forms a perimeter around the fuel tank. In some examples one or more corners of the fuel tank may be rounded or curved so as to reduce accumulation of fuel in corners of the fuel tank. For example, the sidewall may include regions 305 and 306, which are at least partially rounded or curved in a direction extending from the top wall to the bottom wall of the fuel tank. Additionally, sidewall 303 may be at least partially curved along one or more regions of the perimeter of fuel tank 300. In some examples, top wall 301 and bottom wall 302 may have at least partially curved regions to accommodate internal components and/or to increase stiffness and/or to reduce sloshing noise and/or to accommodate fuel tank packaging limitations. For example, the fuel tank may be formed as a substantially rectangular box shape with curved corners, as shown in FIGS. 3A and 3B. However, it should be understood that a variety of fuel tank shapes may be used while remaining within the scope of this disclosure.

Top wall 301, bottom wall 302, and sidewall 303 of fuel tank 300 may be coupled together into a single unit having an outer surface 307 and an inner surface 308. The outer walls of fuel tank 300 form an enclosure or substantially hollow body 310 wherein fuel may be stored. In some examples, hollow body 310 may be substantially sealed to reduce evaporative fuel emissions, e.g. via a fuel tank isolation valve as described with reference to FIG. 2. Inner surface 308 may comprise a barrier layer that is non-reactive with the fuel stored within hollow body 310, for example, ethylene vinyl alcohol or a copolymer thereof.

Top wall 301 may be formed to include a number of apertures, such as aperture 311. As an example, aperture 311 may be substantially circular. Aperture 311 may be sized to enable the insertion of fuel system components, such as a fuel delivery module (not shown), which may include a fuel pump, a fuel reservoir, a fuel filter, a fuel sender assembly, and/or other various fuel system components, actuators, and sensors. Other apertures (not shown) may enable the coupling of conduits, valves, etc. to fuel tank 300. For example, as shown in FIG. 2, top wall 256 of fuel tank 220 accommodates conduits 271, 273, and 275. Similarly, sidewall 303 may include an aperture which may be coupled to a fuel filler pipe or neck (e.g., fuel filler pipe 211 coupled to fuel tank 220).

A top cap 312 may be inserted in aperture 311 to effectively seal hollow body 310. However, top cap 312 may include holes, conduits, or other components to facilitate the delivery of fuel out of fuel tank 300. Top cap 312 may include a lip or flange 315 configured to overlap a region of the top wall 301 adjacent to a perimeter of the aperture 311. Flange 315 may also be substantially circular with an outer flange diameter larger than the diameter of aperture 311, and thus may assist in sealing of the aperture.

Top cap 312 may include or be integrated with locking components 316. In some examples, the locking components may be made of a metal, e.g., steel, or plastic. For example, locking components 316 may be integrally molded to top cap 312. As another example, locking components 316 may be mechanically coupled to the top cap 312, e.g., using various components such as bolts, screws, and the like. In this example, two locking components 316 are shown on opposing sides of aperture 311. However, additional locking components may be included. In some examples, a continuous locking ring may be used.

Locking components 316 may be configured to couple top cap 312 to top wall 301. For example, locking components 316 may be configured to clamp down flange 315 to top wall 301. Thus, one or more components may be included on the top wall of the fuel tank adjacent to the aperture and configured to couple with corresponding elements of locking components 316. As shown in FIG. 3B, at least a portion of locking components 316 may overlap with the top wall 301 of the fuel tank so that they may be coupled thereto.

In some examples, a sealing member 318, e.g., an O-ring or the like, may be disposed between flange 315 and top wall 301 to assist in sealing of aperture 311 when top cap 312 is in an installed position with the locking components in place. Top cap 312 and locking components 316 may be installed in an orientation to create a sufficient amount of pressure on sealing member 318 to hermetically seal the gap between flange 315 and top wall 301.

Top cap 312 may include a plurality of fuel system components coupled thereto. In some examples, top cap 312 may be coupled to the body of a fuel delivery module via any suitable means (mechanical, adhesive, welding, etc.). Top cap 312 is shown coupled to fuel level indicator 320, which may be configured to sense a fuel level in the fuel tank. In other examples, fuel level indicator 320 may be coupled to a fuel delivery module, other internal component, or may be coupled to inner surface 308.

Fuel level indicator 320 includes a pivotal arm 322 and a float device 324 coupled to pivotal arm 322. For example, as a fuel level in the fuel tank increases, the float device 224 may rise with increasing fuel level causing pivotal arm 322 to rotate. Fuel level indicator 320 may be coupled to various components, such as one or more resistors, which may convert the rotational position of pivotal arm 322, and one or more valves, such as a fill limit vent valve, which may be configured to close responsive to float device 324 reaching a threshold distance from top wall 301, thereby sealing fuel tank 300 and generating a back-pressure which may be used to automatically end a refueling event.

The outer walls of fuel tank 300 may be subjected to pressure and vacuum changes, for example due to differences between atmospheric pressure around the tank body and the pressure of a gaseous mixture of air and fuel vapor in the fuel tank body. For example, when gas pressure in the tank body exceeds atmospheric pressure, the top of the tank body may expand away from the bottom of the tank body. When atmospheric pressure exceeds the gas pressure in the tank body, the top of the tank body may collapse toward the bottom of the tank body.

Pressure and vacuum changes experienced by fuel tank 300 may increase when sealed evaporation control (EVAP) systems are employed to reduce evaporative emissions and fuel leakage, e.g., in hybrid electric vehicles. The amount of deflection a region of an outer wall of the fuel tank is subjected to may depend on a variety of properties of the fuel tank. For example, the amount of deflection a region of an outer wall of the fuel tank is subjected to may depend on the shape of the fuel tank, thickness of the walls of the fuel tank, components attached to the outer walls of the fuel tank, materials used in construction of the fuel tank, etc.

For example, one or more regions of top wall 301 and bottom wall 302 may be subjected to a greater amount of deflection during pressure and vacuum changes than regions of fuel tank 300 adjacent to the perimeter of the fuel tank. For example, center regions of top wall 301 and bottom wall 302 positioned substantially equidistant from diametrically opposed locations along the perimeter of the fuel tank may be subjected to a greater amount of deflection during pressure and vacuum changes than regions of the outer walls of the fuel tank adjacent to the perimeter. Regions of the outer walls of fuel tank 300 adjacent to the perimeter may have increased rigidity due to structural support conferred by sidewall 303, for example.

Deflection of fuel tank walls may lead to a degradation of the fuel tank and/or components included in or attached to the outer walls of the fuel tank. For example, such deflections in the outer walls of a fuel tank may generate false signals in various fuel and/or diagnostic sensors disposed within the fuel tank. For example, some such sensors may function by creating a vacuum pressure in the interior of the tank, e.g., during diagnostic tests. The pressure in the tank may then be monitored, e.g., to check for leaks. In such a case, deflections in the outer walls of the fuel tank may lead to false signals, e.g., a diagnostic test may indicate a false leak reading during a diagnostic test.

In order to at least partially reduce deflections in the outer walls of the fuel tank, structurally supportive stanchions, such as stanchions 330 and 335, may be coupled to regions of top wall 301 and bottom wall 302. In some examples, the stanchions may be coupled to regions of top wall 301 and bottom wall 302 which are subjected to maximal deflections. In such a case various modeling routines may be used to determine regions of the outer walls which may be subjected to a maximal amount of deflection during vacuum and pressure changes. For example, a finite element analysis may be performed on the outer walls of fuel tank 300 to determine regions of the outer walls which may be subjected to a maximal deflection. Stanchions 330 and 335 may provide rigidity to fuel tank 300, and may protect fuel tank 300 from deformation during extreme temperatures. While two stanchions are shown, it should be understood that a single stanchion or three or more stanchions may be employed without departing from the scope of this disclosure.

Stanchions 330 and 335 are depicted as columnar structures, but other shapes or designs may be used, such as cross-bracing, or stanchions that extend laterally across a length or width of the fuel tank. Other support features or means of increasing the rigidity of fuel tank 300, externally and/or internally may be used along with stanchions 330 and 335. The stanchions may be made from the same material as the outer walls of fuel tank 300, or may be made from another material that is non-reactive with fuel stored in hollow body 310. In some examples, stanchions 330 and 335 may comprise one or more apertures, baffles, or other features configured to reduce fuel sloshing. Apertures may further reduce the volume of the stanchions, increasing the amount of fuel that may be stored in fuel tank 300.

Stanchions 330 and 335 may be strategically placed based on deformation models of fuel tank 300. The placement of stanchions 330 and 335 may further be based on the positioning of other components within fuel tank 300. For example, the stanchions may be placed in a position that is a threshold distance from a fuel delivery module. Further, stanchion 335 may be placed at a threshold distance from fuel level indicator 320, so as not to interfere with the movement of float device 324 or pivotal arm 322. The installation of stanchions 330 and 335 within fuel tank 300 may be performed before and/or after the installation of other internal componentry, depending on the configuration of fuel tank 300. Stanchions 330 and 335 may be manufactured as a single, continuous piece, or may be manufactured as multiple components which can be coupled together.

Stanchion 330 comprises a top wall coupling region 331 and a bottom wall coupling region 332. Top wall coupling region 331 may interface with top wall 301 at first upper stanchion mount 333, while bottom wall coupling region 332 may interface with bottom wall 302 at first lower stanchion mount 334. Similarly, stanchion 335 comprises a top wall coupling region 336 and a bottom wall coupling region 337. Top wall coupling region 336 may interface with top wall 301 at second upper stanchion mount 338, while bottom wall coupling region 337 may interface with bottom wall 302 at second lower stanchion mount 339.

The upper and lower stanchion mounts may be contiguous with inner surface 308, for example, in examples where the outer walls of fuel tank 300 are manufactured using a molding or stamping process. In other examples, the upper and lower stanchion mounts may be manufactured independently of the outer walls of fuel tank 300, and may thus be secured to top wall 301 and bottom wall 302 through any suitable means. In some examples, the upper and lower stanchion mounts may directly engage with the corresponding coupling regions, for example, by receiving a coupling region via threading, snap-fitting, etc. Additionally or alternatively, the coupling regions may be secured to the outer walls of fuel tank 300 via bolts, clamps, etc. that may require coupling apertures to be provided at the sites of the stanchion mounts. Such apertures may extend through inner surface 308 and/or outer surface 307.

When attached within fuel tank 300, stanchions 330 and 335 may provide rigidity to the fuel tank, limiting the expansion and contraction of the fuel tank due to internal pressure or vacuum. Stanchion mounts may be strategically positioned based on modeling and/or physical studies that indicate where fuel tank 300 is likely to deflect the most due to increased pressure or vacuum. Thus, the installed stanchions provide a counter-acting force, maintaining the distance between corresponding points on top wall 301 and bottom wall 302 that is robust to changes in fuel tank pressure (e.g., over a diurnal cycle).

However, during an accident or other impactful event, stanchions 330 and 335 are susceptible to breaking. If either stanchion is compromised, the fuel tank may be subject to deflection when exposed to significant temperature swings. When deflection is severe, the outer walls of fuel tank 300 may become degraded, releasing undesired evaporative emissions and/or spilling liquid fuel.

As the positioning of stanchions 330 and 335 is strategic, the direction(s) of likely fuel tank deflection in the event of a stanchion breaking is predictable. In order to determine if a stanchion is degraded, strain gauges may be coupled to each stanchion. Rather than mounting strain gauges to the stanchions themselves, where they would be subjected to the harsh environment within fuel tank 300, strain gauges may be mounted externally to fuel tank 300. In this example, first strain gauge 340 is mounted to top wall 301 on outer surface 307, opposite top wall coupling region 331, while second strain gauge 341 is mounted to top wall 301 on outer surface 307, and opposite top wall coupling region 336. Additionally or alternatively, strain gauges may be mounted to bottom wall 302 at positions opposite first lower stanchion mount 334 and/or second lower stanchion mount 339. Further, strain gauges may be mounted to other locations on outer surface 307 where significant deflection is anticipated in the event of stanchion degradation.

Strain gauges 340 and 341 are shown in more detail in FIG. 3B. In this example, strain gauges 340 and 341 are depicted as thin-film or foil strain gauges, though other types of strain gauges may be used (e.g., capacitive strain gauges, fiber-optic strain gauges, nanoparticle based strain gauges, piezo-resistors). Strain gauges 340 and 341 may be mounted directly onto top wall 301 (e.g., a bonded strain gauge).

Strain gauge 340 may indicated an electrical resistance between first terminal 350 and second terminal 351, which may then be used to infer a local amount of induced stress. Terminals 350 and 351 are connected via conductive film 352, depicted as a series of parallel strips connected at adjacent ends into a zig-zag pattern. Terminals 350 and 351, along with conductive film 352 may be mounted onto a flexible substrate 353. Flexible substrate may be mounted onto top wall 301 via any suitable adhesive. Similarly, strain gauge 341 comprises a first terminal 355, a second terminal 356, conductive film 357, and substrate 358.

Strain gauges 340 and 341 may be configured to alter internal resistance responsive to strain in a first direction, but not in a second direction, orthogonal to the first direction. For example, strain gauge 340 may be responsive to strain forces along first axis 360, but not along orthogonal second axis 365. As conductive film 352 is exposed to tension along first axis 360, the resistance between first terminal 350 and 351 is increased, due to the lengthening of the electrical pathway concurrent with the narrowing of each strip of conductive film. When conductive film 352 is compressed along first axis 360, the resistance between first terminal 350 and 351 is decreased, due to the shortening of the electrical pathway concurrent with the widening of each strip of conductive film. However, tension or compression along second axis 365 will result in internal resistance changes that are several magnitudes less than for strain along first axis 360. Thus, strain gauges 340 and 341 may be mounted to top wall 301 with an orientation that is based on modeling and/or physical studies that indicate which direction fuel tank 300 is likely to deflect responsive to degradation of stanchions 330 and 335, respectively. In this example, stain gauge 341 is shown oriented to be responsive to strain along second axis 365, but not along orthogonal first axis 360. Expansion and contraction of conductive films 352 and 357 due to temperature may be compensated for using dummy gauges (not shown) and/or by manufacturing the conductive films out conductive alloys with low temperature coefficients of resistance, such as constantan, manganin, etc.

Figure 4:
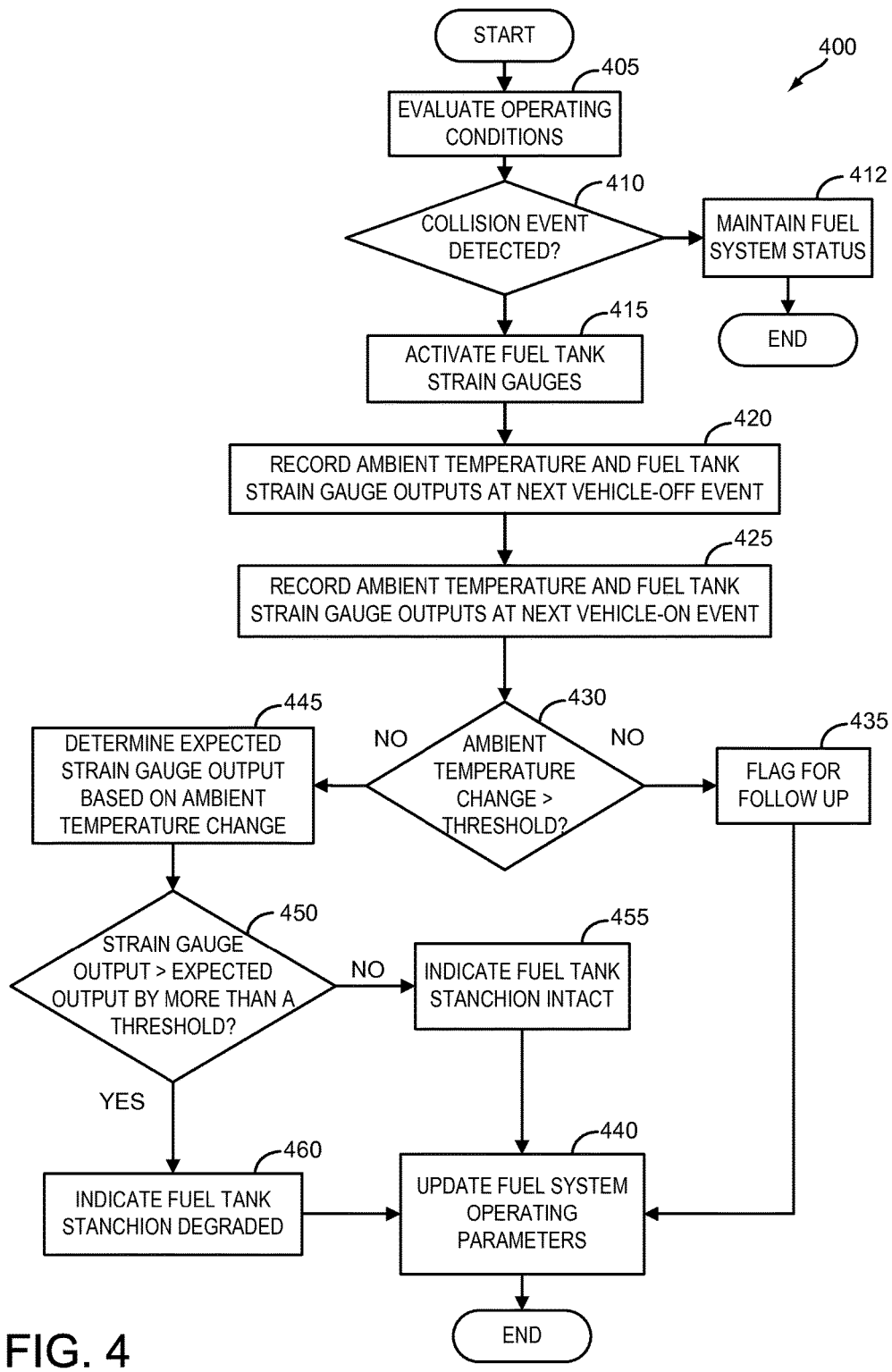
FIG. 4 shows a flow-chart for a high level method of determining the integrity of a deformable fuel tank.
Figure 5:
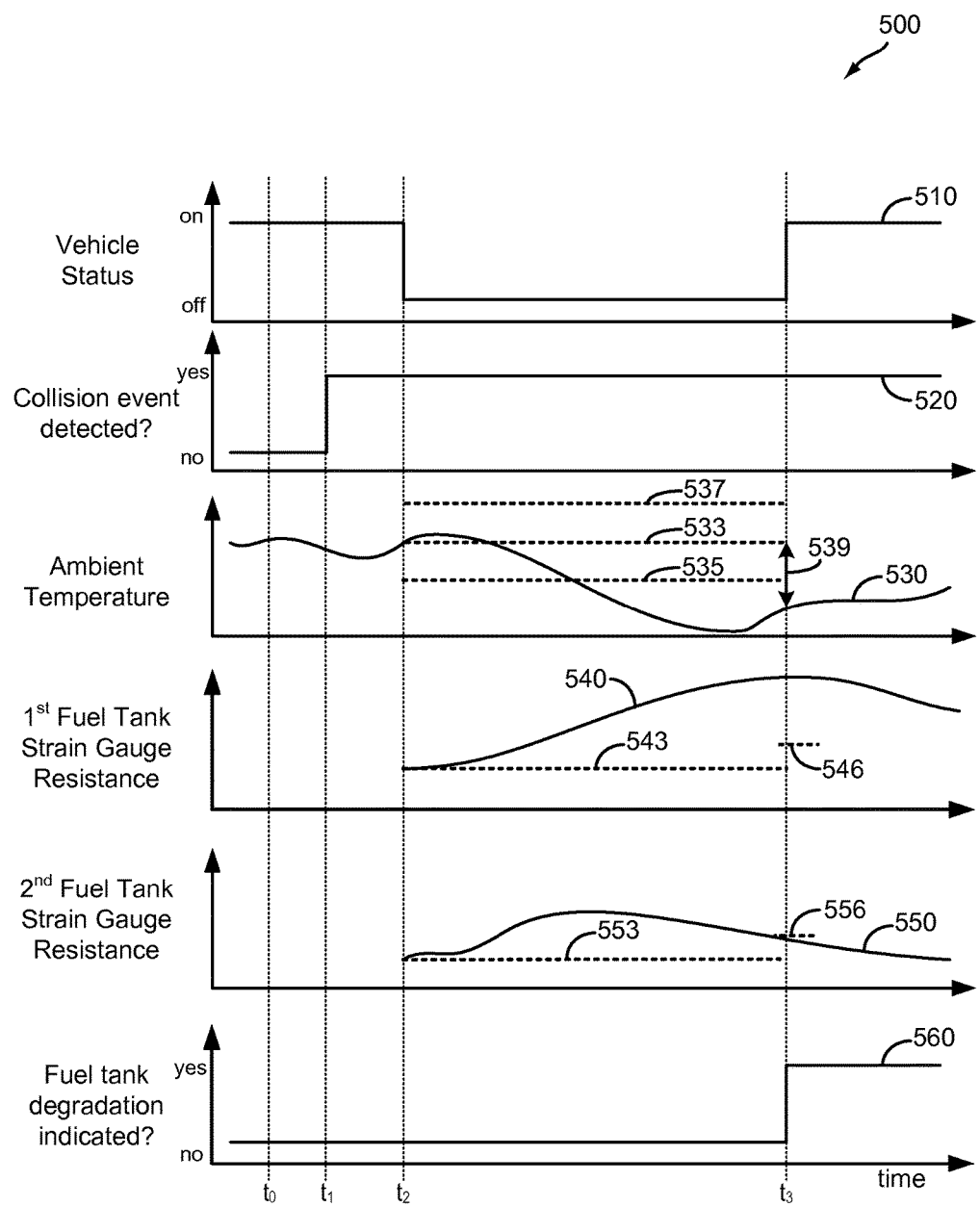
FIG. 5 shows a timeline for an example vehicle collision event and subsequent fuel tank integrity diagnosis.

Turning to FIG. 4, a flow chart is depicted for a high level method 400 for determining the integrity of internal fuel tank structural supports. Instructions for carrying out method 400 and other methods included herein may be executed by a controller based on instructions stored in non-transitory memory of the controller, and in conjunction with signals received from sensors of the fuel and vehicle systems, such as the sensors described above with reference to FIGS. 1, 2, and 3A-3B. The controller may employ actuators of the vehicle system to adjust vehicle operation, according to the methods described below. While described with reference to the systems depicted in FIGS. 1, 2, and 3A-3B, it should be understood that method 400 or similar methods may be applied to other systems without departing from the scope of this disclosure.

Method 400 begins at 405 and includes evaluating operating conditions. Operating conditions may be measured, estimated, and/or inferred, and may be based on signals received from one or more sensors, as described with reference to FIGS. 1, 2, and 3A-3B. Among others, operating conditions may include various vehicle conditions, such as vehicle speed, vehicle location, vehicle operation status, etc., various engine conditions, such as engine operating mode, engine speed, engine load, etc., various fuel system conditions, such as fuel level, fuel tank pressure, canister load, etc., and various ambient conditions, such as ambient temperature, barometric pressure, humidity, etc.

Continuing at 410, method 400 includes determining whether a collision event has been detected. A collision event may be indicated by a designated crash sensor, such as crash sensor 188 depicted in FIG. 1. Additionally or alternatively, a collision event may be determined based on the output of one or more sensors, such as a vehicle speed sensor, and/or the actuation of one or more safety devices, such as airbags or seatbelt restraints. If no collision event has been detected, method 400 proceeds to 412, and includes maintaining the status of the fuel system. For example, fuel tank strain gauges may be maintained in an inactive state. Method 400 may then end.

If a collision event is detected, method 400 proceeds to 415. At 415, method 400 includes activating fuel tank strain gauges, such as strain gauges 340 and 341 depicted in FIGS. 3A-3B. Activation of strain gauges may include routing electricity to the strain gauges, e.g., via a switching transistor, routing electricity to one or more sensors configured to measure the resistance of the strain gauges, and/or actively monitoring the output of the strain gauges and associated sensors.

Continuing at 420, method 400 includes recording a first ambient temperature as well as the outputs of the fuel tank strain gauges at a next vehicle-off event. A vehicle-off condition may include a key-off condition, a remote or near field vehicle-off request, a user setting a vehicle alarm, etc. Ambient temperature may be measured (e.g., via an onboard ambient temperature sensor), estimated, or inferred, or may be determined by accessing an off-board weather resource accessible via a vehicle communications system. The strain gauge output may represent an amount of strain being applied to a strain gauge in one or more predetermined directions. For example, using thin-film strain gauges, such as strain gauges 340 and 341, the strain gauge output may indicate an internal resistance of the strain gauge that is proportionate to the amount of strain being applied to a strain gauge across a first axis of the fuel tank. In some examples, fuel tank temperature, fuel tank pressure, fuel level indicator output, and/or outputs of other fuel system sensors may be recorded. The fuel tank strain gauge outputs may be recorded as first fuel tank strain values.

Continuing at 425, method 400 includes recording a second ambient temperature as well as the outputs of the fuel tank strain gauges at a next vehicle-on event. The fuel tank strain gauge outputs may be recorded as second fuel tank strain values. Additionally or alternatively, ambient temperature and/or the outputs of the fuel tank strain gauges may be monitored during the vehicle-off event, and recorded responsive to a change in ambient temperature greater than a threshold.

Continuing at 430, method 400 includes determining whether the ambient temperature change between the first ambient temperature and second ambient temperature is greater than a threshold. The ambient temperature change threshold may be pre-determined, or may be based on current conditions. The ambient temperature change threshold may be representative of a change in temperature that would cause a threshold fuel tank pressure change (increase in fuel tank pressure responsive to an increase in ambient temperature, increase in fuel tank vacuum responsive to a decrease in ambient temperature). The threshold fuel tank pressure change may be determined based on a pressure differential that is likely to cause deformation or deflection of the fuel tank if one or more fuel tank stanchions are degraded.

If the ambient temperature change is below the threshold, method 400 proceeds to 435, and includes setting a flag at the controller to follow up at a later time point. For example, a future vehicle-off event may cause method 400 to be executed. The strain gauges may be deactivated. In other examples, the strain gauges may be maintained active while the vehicle is on, and their output evaluated along with data gathered from other fuel system, vehicle, and ambient sensors. Method 400 then proceeds to 440, and includes updating one or more fuel system operating parameters. For example, fuel tank venting and fuel vapor canister purging schedules may be updated to reflect that the integrity of the fuel tank is unknown. Method 400 may then end.

Returning to 430, if the ambient temperature change is above the threshold, method 400 then proceeds to 445. At 445, method 400 includes determining an expected strain gauge output based on the ambient temperature change. In other words, given the change in ambient pressure and a first strain gauge output (at the vehicle-off condition), an expected strain gauge output may be predicted for each strain gauge based on an expected amount of fuel tank deformation or deflection that would occur if the fuel tank stanchions were intact.

Continuing at 450, method 400 includes determining whether each actual strain gauge output is greater than the expected strain gauge output by more than a threshold. If each of the actual strain gauge outputs is within a threshold of their corresponding expected strain gauge outputs, method 400 then proceeds to 455, and includes indicating that the fuel tank stanchions are intact. Indicating that the fuel tank stanchions are intact may include recording fuel tank stanchion integrity at a controller. Method 400 then proceeds to 440, and includes updating one or more fuel system operating parameters. For example, the fuel tank strain gauges may be deactivated, and any restrictions placed on fuel system operating following the detected collision event may be removed. Method 400 may then end.

If any of the actual strain gauge outputs are more than a threshold greater than their corresponding expected strain gauge outputs, method 400 then proceeds to 460, and includes indicating that the indicated fuel tank stanchions are degraded. Indicating that the fuel tank stanchions are degraded may include recording the identification of any degraded fuel tank stanchions at the controller, and may further include setting a malfunction indicator lamp, or other means of indicating the vehicle operator to the potential for fuel tank degradation. Method 400 then proceeds to 440, and includes updating one or more fuel system operating parameters. For example, additional tests may be scheduled to determine the nature of the fuel tank degradation, including determining if unwanted emissions are being released from the fuel tank, and/or if liquid fuel is being leaked from the fuel tank. Further, restrictions on vehicle operation may be implemented. Method 400 may then end.

Turning to FIG. 5, an example timeline 500 is shown for a vehicle collision event using the method described herein and with regard to FIG. 4, as applied to a vehicle including a fuel tank comprising stanchions and strain gauges as described herein and with regard to FIGS. 1, 2, 3A, and 3B. Timeline 500 includes plot 510, indicating a vehicle status over time, and plot 520, indicating whether a collision event has been detected over time. Timeline 500 further includes plot 530, indicating ambient temperature over time. Line 533 represents a first ambient temperature, lines 535 and 537 represent ambient temperature change thresholds, and line 539 represents an ambient temperature change from the first ambient temperature to a second ambient temperature. Timeline 500 further includes plot 540, indicating a first fuel tank strain gauge resistance over time. Line 543 represents a first recorded resistance, while line 546 indicates a resistance threshold based on ambient temperature change. Timeline 500 further includes plot 550, indicating a second fuel tank strain gauge resistance over time. Line 553 represents a first recorded resistance, while line 556 indicates a resistance threshold based on ambient temperature change. Timeline 500 further includes plot 560, indicating whether fuel tank degradation is indicated over time.

At time $t_0$, the vehicle is on, as indicated by plot 510, and no collision event has been detected, as indicated by plot 520. At time $t_1$, a collision event is detected. Accordingly, at time $t_2$, when the vehicle is turned off, $1^{st}$ and $2^{nd}$ fuel tank strain gauges are activated, and their resistances recorded. Lines 543 and 553 represent these initial resistances. Ambient temperature is also recorded at time $t_2$, as represented by line 533. Ambient temperature thresholds are then set, represented by line 535 (threshold below) and line 537 (threshold above).

At time $t_3$, the vehicle is turned on. Ambient temperature is below the threshold represented by line 535. Accordingly, the ambient temperature change between time $t_2$ and time $t_3$ is determined, as represented by line 539. Expected fuel tank strain gauge resistances are then determined based on the ambient temperature change and the strain gauge resistances at time $t_2$, as represented by lines 546 and 556. The $2^{nd}$ fuel tank strain gauge resistance is within a threshold of the expected resistance, as shown by plot 550. However, the $1^{st}$ fuel tank strain gauge resistance is more than a threshold greater than the expected resistance, as shown by plot 540. Accordingly, fuel tank degradation is indicated, as shown by plot 560.

The systems described herein and with reference to FIGS. 1, 2, and 3A-3B, along with the method described herein and with reference to FIG. 4 may enable one or more systems and one or more methods. In one example, a fuel system is presented, comprising: a fuel tank including at least a top wall and a bottom wall; one or more stanchions positioned within the fuel tank, each stanchion coupled to the top wall and the bottom wall; and a strain gauge positioned on an outer surface of the fuel tank, opposite an intersection of a stanchion and the top wall. In this example, or any other example, each stanchion may additionally or alternatively comprise an upper stanchion mount, the upper stanchion mount configured to couple the stanchion to the top wall at a top wall coupling region on an inner surface of the fuel tank. In this example, or any other example, the strain gauge may additionally or alternatively be positioned on an outer surface of the top wall, opposite the top wall coupling region. In this example, or any other example, each stanchion may additionally or alternatively comprise a lower stanchion mount, the lower stanchion mount configured to couple the stanchion to the bottom wall at a bottom wall coupling region on the inner surface of the fuel tank. In this example, or any other example, the fuel tank may additionally or alternatively comprise a sidewall coupled between the top wall and the bottom wall, the sidewall, top wall, and bottom wall forming a hollow body wherein the one or more stanchions are positioned. In this example, or any other example, one or more of the top wall, sidewall, and bottom wall may additionally or alternatively be deformable, such that a volume of the fuel tank changes proportionate to a ratio of an internal fuel tank pressure and an ambient pressure. In this example, or any other example, the one or more stanchions may additionally or alternatively be placed within the hollow body such that an increase in the ratio of internal fuel tank pressure and ambient pressure results in a reduced increase in the volume of the fuel tank than would otherwise occur without stanchions placed within the hollow body. In this example, or any other example, each strain gauge may additionally or alternatively be oriented on a deformation axis such that degradation of a stanchion opposite the strain gauge results in pressure-dependent deformation of the fuel tank along the deformation axis. In this example, or any other example, one or more of the top wall, sidewall, and bottom wall may additionally or alternatively be manufactured from a polymeric material. In this example, or any other example, the fuel system may additionally or alternatively comprise a fuel tank isolation valve coupled to the fuel tank and configured to reversibly seal the fuel tank from atmosphere. In this example, or any other example, the fuel tank may additionally or alternatively be configured to hold a liquid fuel. In this example, or any other example, each strain gauge may additionally or alternatively be a thin-film strain gauge. The technical result of implementing this fuel system is that the integrity of each fuel tank stanchion may be monitored by gauging strain indicative of fuel tank deformation due to stanchion degradation. In this way, fuel tank degradation may be indicated prior to the deformation causing breaches to the outer walls of the fuel tank.

In another example, a method for a vehicle is presented, comprising: at a vehicle-off event following receipt of an indication of a collision event, indicating a first ambient temperature based on a signal received from an ambient temperature sensor, and indicating a first fuel tank strain value based on a signal received via a strain gauge coupled to an outer surface of a fuel tank; at a subsequent vehicle-on event, indicating a second ambient temperature based on a signal received from the ambient temperature sensor, and indicating a second fuel tank strain value based on a signal received via the strain gauge; determining an ambient temperature change based on the first and second ambient temperatures; determining a fuel tank strain change based on the first and second fuel tank strain values; indicating structural degradation of the fuel tank responsive to an ambient temperature change greater than a threshold and a fuel tank strain change greater than a threshold. In this example, or any other example, indicating structural degradation of the fuel tank may additionally or alternatively comprise indicating degradation of a stanchion located within the fuel tank. In this example, or any other example, the stanchion may additionally or alternatively be coupled to an inner surface of a top wall of the fuel tank at a top wall coupling region, and wherein the strain gauge is coupled to an outer surface of the top wall opposite the top wall coupling region. In this example, or any other example, the method may additionally or alternatively comprise updating one or more fuel system operating parameters responsive to an indication of structural degradation of the fuel tank. In this example, or any other example, the signals received via the strain gauge may additionally or alternatively indicate an internal resistance of the strain gauge. The technical result of implementing this method is that fuel tank integrity may be determined following a vehicle collision event. By determining fuel tank integrity following an ambient temperature change greater than a threshold, an amount of expected fuel tank deformation may be compared to an actual amount of fuel tank deformation. In this way, a degraded fuel tank that has not been subject to a significant internal pressure change is not misdiagnosed as being intact.

In yet another example, a vehicle system is presented, comprising a collision sensor; an ambient temperature sensor a fuel tank including at least a top wall and a bottom wall, the fuel tank configured to store a liquid fuel; one or more stanchions positioned within the fuel tank, each stanchion coupled to the top wall and the bottom wall; a strain gauge positioned on an outer surface of the fuel tank, opposite an intersection of a stanchion and the top wall; and a controller configured with instructions stored in non-transitory memory, that when executed, cause the controller to: receive an indication of a vehicle collision from the collision sensor; indicating an ambient temperature based on a signal received from the ambient temperature sensor, and indicating a first fuel tank strain value based on a signal received via the strain gauge; following a duration comprising an ambient temperature change greater than a threshold, indicating a second fuel tank strain value based on a signal received via the strain gauge; determining a fuel tank strain change based on the first and second fuel tank strain values; determining a strain threshold based on at least the ambient temperature change and the first fuel tank strain value; and indicating structural degradation of a stanchion responsive to a fuel tank strain change greater than the strain threshold. In this example, or any other example, the fuel tank may additionally or alternatively include a sidewall coupled between the top wall and the bottom wall, the sidewall, top wall, and bottom wall forming a hollow body wherein the one or more stanchions are positioned, and one or more of the top wall, sidewall, and bottom wall may additionally or alternatively be deformable, such that a volume of the fuel tank changes proportionate to a ratio of an internal fuel tank pressure and an ambient pressure. In this example, or any other example, the stanchion may additionally or alternatively be coupled to an inner surface of the top wall of the fuel tank at a top wall coupling region, and wherein the strain gauge is coupled to an outer surface of the top wall opposite the top wall coupling region. The technical result of implementing this vehicle system is a reduction in fuel loss. The use of a deformable tank allows an increase in fuel economy, as the fuel tank may have reduced mass. Further, by diagnosing degradation of internal fuel tank supports, a vehicle operator can be notified prior to the fuel tank deforming to the point where fuel is lost.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system, comprising:
a fuel tank including at least a top wall and a bottom wall;
one or more stanchions positioned within the fuel tank, each stanchion including an upper stanchion mount and a lower stanchion mount, the upper stanchion mount configured to couple the stanchion to the top wall at a top wall coupling region on an inner surface of the fuel tank and the lower stanchion mount configured to couple the stanchion to the bottom wall at a bottom wall coupling region on the inner surface of the fuel tank; and a strain gauge positioned on an outer surface of the top wall of the fuel tank, opposite an intersection of a stanchion and the top wall at the top wall coupling region.

2. The fuel system of claim 1, wherein the fuel tank includes a sidewall coupled between the top wall and the bottom wall, the sidewall, top wall, and bottom wall forming a hollow body wherein the one or more stanchions are positioned.

3. The fuel system of claim 2, wherein one or more of the top wall, sidewall, and bottom wall are deformable, such that a volume of the fuel tank changes proportionate to a ratio of an internal fuel tank pressure and an ambient pressure.

4. The fuel system of claim 3, wherein the one or more stanchions are placed within the hollow body such that an increase in the ratio of internal fuel tank pressure and ambient pressure results in a reduced increase in the volume of the fuel tank than would otherwise occur without stanchions placed within the hollow body.

5. The fuel system of claim 3, wherein each strain gauge is oriented on a deformation axis such that degradation of a stanchion opposite the strain gauge results in pressure-dependent deformation of the fuel tank along the deformation axis.

6. The fuel system of claim 3, wherein one or more of the top wall, sidewall, and bottom wall are manufactured from a polymeric material.

7. The fuel system of claim 1, further comprising:
a fuel tank isolation valve coupled to the fuel tank and configured to reversibly seal the fuel tank from atmosphere.

8. The fuel system of claim 1, wherein the fuel tank is configured to hold a liquid fuel.

9. The fuel system of claim 1, wherein each strain gauge is a thin-film strain gauge.

10. A method for a vehicle, comprising:
at a vehicle-off event following receipt of an indication of a collision event, indicating a first ambient temperature based on a signal received from an ambient temperature sensor, and indicating a first fuel tank strain value based on a signal received via a strain gauge coupled to an outer surface of a fuel tank, the fuel tank including a stanchion coupled to an inner surface of a top wall of the fuel tank at a top wall coupling region, the strain gauge coupled to an outer surface of the top wall directly opposite the top wall coupling region;
at a subsequent vehicle-on event, indicating a second ambient temperature based on a signal received from the ambient temperature sensor, and indicating a second fuel tank strain value based on a signal received via the strain gauge;
determining an ambient temperature change based on the first and second ambient temperatures;
determining a fuel tank strain change based on the first and second fuel tank strain values; and
indicating structural degradation of the fuel tank responsive to an ambient temperature change greater than a threshold and a fuel tank strain change greater than a threshold.

11. The method of claim 10, further comprising:
updating one or more fuel system operating parameters responsive to an indication of structural degradation of the fuel tank.

12. The method of claim 10, wherein signals received via the strain gauge indicate an internal resistance of the strain gauge.

13. A vehicle system, comprising:
a collision sensor;
an ambient temperature sensor;
a fuel tank including at least a top wall and a bottom wall, the fuel tank configured to store a liquid fuel;
one or more stanchions positioned within the fuel tank, each stanchion coupled to the top wall and the bottom wall, the stanchion coupled to an inner surface of the top wall at a top wall coupling region;
a strain gauge positioned on an outer surface of the top wall of the fuel tank, opposite an intersection of a stanchion and the top wall at the top wall coupling region; and
a controller configured with instructions stored in non-transitory memory, that when executed, cause the controller to:
receive an indication of a vehicle collision from the collision sensor;
indicate an ambient temperature based on a signal received from the ambient temperature sensor, and indicate a first fuel tank strain value based on a signal received via the strain gauge;
following a duration comprising an ambient temperature change greater than a threshold, indicate a second fuel tank strain value based on a signal received via the strain gauge;
determine a fuel tank strain change based on the first and second fuel tank strain values;
determine a strain threshold based on at least the ambient temperature change and the first fuel tank strain value; and
indicate structural degradation of a stanchion responsive to a fuel tank strain change greater than the strain threshold.

14. The vehicle system of claim 13, wherein the fuel tank includes a sidewall coupled between the top wall and the bottom wall, the sidewall, top wall, and bottom wall forming a hollow body wherein the one or more stanchions are positioned, and wherein one or more of the top wall, sidewall, and bottom wall are deformable, such that a volume of the fuel tank changes proportionate to a ratio of an internal fuel tank pressure and an ambient pressure.

* * * * *